(12) United States Patent
Sørensen

(10) Patent No.: US 11,592,299 B2
(45) Date of Patent: Feb. 28, 2023

(54) USING STATIC SCORES TO CONTROL VEHICLE OPERATIONS

(71) Applicant: Mobile Industrial Robots A/S, Odense SØ (DK)

(72) Inventor: Elias Ingemann Thrane Sørensen, Odense N (DK)

(73) Assignee: MOBILE INDUSTRIAL ROBOTS A/S, Odense Soe (DK)

(*) Notice: Subject to any disclaimer, the term of this patent is extended or adjusted under 35 U.S.C. 154(b) by 267 days.

(21) Appl. No.: 16/823,716

(22) Filed: Mar. 19, 2020

(65) Prior Publication Data

US 2021/0293548 A1   Sep. 23, 2021

(51) Int. Cl.
| | |
|---|---|
| G01C 21/00 | (2006.01) |
| G01C 21/32 | (2006.01) |
| G01S 17/931 | (2020.01) |
| G01S 17/86 | (2020.01) |
| G01C 21/34 | (2006.01) |
| G01S 17/89 | (2020.01) |
| G05D 1/02 | (2020.01) |

(52) U.S. Cl.
CPC ......... G01C 21/32 (2013.01); G01C 21/3461 (2013.01); G01S 17/86 (2020.01); G01S 17/89 (2013.01); G01S 17/931 (2020.01)

(58) Field of Classification Search
CPC .... G01C 21/00; G01C 21/32; G01C 21/3461; G01S 17/931; G01S 17/86; G01S 17/89; G05D 1/02
See application file for complete search history.

(56) References Cited

U.S. PATENT DOCUMENTS

| | | |
|---|---|---|
| 5,983,161 A | 11/1999 | Lemelson |
| 6,493,607 B1 | 12/2002 | Bourne et al. |
| 6,594,844 B2 | 7/2003 | Jones |
| 7,196,487 B2 | 3/2007 | Jones |
| 8,874,300 B2 | 10/2014 | Allard et al. |
| 9,110,470 B2 | 8/2015 | Karlsson et al. |
| 9,402,151 B2 | 7/2016 | Song et al. |
| 9,415,310 B2 | 8/2016 | Martini |

(Continued)

FOREIGN PATENT DOCUMENTS

| | | |
|---|---|---|
| CA | 2416382 A1 | 2/2006 |
| EP | 2108563 A2 | 10/2009 |

(Continued)

OTHER PUBLICATIONS

MIR 500 User Guide. Mobile Industrial Robots A/S. Odense, SØ. (Sep. 2019). V. 1.3, (pp. 1-100). 100 pages.

(Continued)

*Primary Examiner* — Tan Q Nguyen
(74) *Attorney, Agent, or Firm* — Burns & Levinson LLP

(57) ABSTRACT

An example system includes a sensor for obtaining information about an object in an environment and one or more processing devices configured to use the information in generating or updating a map of the environment. The map includes the object and boundaries or landmarks in the environment. The map includes a static score associated with the object. The static score represents a likelihood that the object will remain immobile within the environment. The likelihood may be between certain immobility and certain mobility.

31 Claims, 5 Drawing Sheets

(56) References Cited

U.S. PATENT DOCUMENTS

| | | | |
|---|---|---|---|
| 9,440,354 B2 | 9/2016 | Gutmann et al. | |
| 9,606,544 B2 | 3/2017 | Gariepy et al. | |
| 9,663,025 B2 | 5/2017 | Drexler et al. | |
| 9,891,630 B2 | 2/2018 | Gariepy et al. | |
| 9,918,605 B2 | 3/2018 | Wolfe et al. | |
| 10,028,632 B2 | 7/2018 | Britain et al. | |
| 2004/0013295 A1 | 1/2004 | Sabe et al. | |
| 2004/0093650 A1 | 5/2004 | Martins et al. | |
| 2004/0158354 A1 | 8/2004 | Lee et al. | |
| 2005/0216182 A1 | 9/2005 | Hussain et al. | |
| 2006/0042842 A1 | 3/2006 | Berg et al. | |
| 2009/0125225 A1 | 5/2009 | Hussain et al. | |
| 2011/0166737 A1 | 7/2011 | Tanaka et al. | |
| 2014/0074342 A1* | 3/2014 | Wong | G05D 1/021 701/26 |
| 2014/0110183 A1 | 4/2014 | Rudakevych et al. | |
| 2014/0129027 A1 | 5/2014 | Schnittman | |
| 2014/0309841 A1* | 10/2014 | Hara | G05D 1/0274 701/26 |
| 2015/0212521 A1* | 7/2015 | Pack | G05D 1/0214 701/28 |
| 2016/0062361 A1* | 3/2016 | Nakano | G05D 1/0274 701/25 |
| 2016/0144511 A1* | 5/2016 | Romanov | G05D 1/027 701/28 |
| 2016/0147230 A1* | 5/2016 | Munich | G05D 1/0246 701/28 |
| 2017/0031366 A1 | 2/2017 | Shamlian et al. | |
| 2017/0038776 A1 | 2/2017 | Gariepy et al. | |
| 2017/0080850 A1 | 3/2017 | Drexler et al. | |
| 2017/0197643 A1 | 7/2017 | Gariepy et al. | |
| 2017/0232885 A1 | 8/2017 | Drexler et al. | |
| 2017/0248963 A1 | 8/2017 | Levinson et al. | |
| 2017/0276501 A1 | 9/2017 | Wise et al. | |
| 2018/0156622 A1 | 6/2018 | Mouthaan et al. | |
| 2018/0261023 A1 | 9/2018 | Blayvas et al. | |
| 2018/0281178 A1 | 10/2018 | Jacobsen | |
| 2018/0281191 A1 | 10/2018 | Sinyavskiy et al. | |
| 2018/0333850 A1 | 11/2018 | Komlósi | |
| 2018/0364724 A1 | 12/2018 | Ibarz Gabardos | |
| 2019/0250627 A1 | 8/2019 | Witt et al. | |
| 2019/0384314 A1 | 12/2019 | Jacobsen | |
| 2020/0004247 A1 | 1/2020 | Jacobsen et al. | |

FOREIGN PATENT DOCUMENTS

| | | |
|---|---|---|
| GB | 2436712 A | 10/2007 |
| WO | 2006089071 A1 | 8/2006 |
| WO | 2015047195 A1 | 4/2015 |
| WO | 2016057140 A1 | 4/2016 |
| WO | 2016165721 A1 | 10/2016 |

OTHER PUBLICATIONS

MIR Fleet Reference Guide. Mobile Industrial Robots A/S. Odense, SØ. (Jan. 2017). V. 1.0, (pp. 1-30). 32 pages.

MIR 100 User Guide. Mobile Industrial Robots A/S. Odense, SØ. (Aug. 2018). V. 1.1, (pp. 1-42). 44 pages.

MIR 100 User Guide. Mobile Industrial Robots A/S. Odense, SØ. (Nov. 2017). V. 1.0, (pp. 1-37). 39 pages.

Blizzard, Classic games, Warcraft: Orcs & Humans (1994). [Online]. Available: http://us.blizzard.com/en-us/games/legacy. [Last accessed Dec. 26, 2017].

Borenstein, J. et al., Mobile Robots Positioning: Sensors and Techniques, Journal of Robotic Systems, 14(4): 231-249 (1997).

Burgard, W. and Bennewitz, M. et al., Introduction to Mobile Robotics, Robot Motion Planning, University of Freiburg, 151 pages (Jul. 2011).

Dixon, J., and Henlich O., Mobile Robot Navigation, Final Report, Imperial College, London, 27 pages (Jun. 10, 1997). [Online]. Available: https://www.doc.ic.ac.uk/~nd/surprise_97/journal/vol4/jmd/ . [Accessed Jun. 22, 2017].

Dos Gamers Archive, Warcraft II: Tides of Darkness, 1 page (1995). [Retrieved Online Aug. 15, 2018]. Available: http://image.dosgamesarchive.com/screenshots/war2_06.png.

Edwards, T. and Sorme, J., A Comparison of Path Planning Algorithms for Robotic Vacuum Cleaners, Degree Project in Technology, KTH Royal Institute Of Technology, School of Electrical Engineering and Computer Science, Stockholm, Sweden, 37 pages (2018).

European Search Report for EP16779651.5, 7 pages (dated Nov. 30, 2018).

Expomondo, EXPO 2000, Themenpark & Außengelände, Deutschland, Holtmann International, (2000). [Online]. Available: http://expomondo.it/expo.html.

ferzkopp.net, 2000. [Retrieved Online Aug. 15, 2018]. Available: http://www.ferzkopp.net/MediaAndArt/Expo2000/Softwaremodule.gif.

Goel, P. et al., Robot Localization Using Relative and Absolute Position Estimates, In Proc. Int. Conf. Intelligent Robots and Systems, IROS '99, 7 pages (1999).

International Search Report for PCT/DK2016/050104, 8 pages (dated Jun. 27, 2016).

Mobile Industrial Robots, MiRFleet, Reference Guide, v.1.0, 32 pages (Jan. 2017).

Nedelea, A., Hyundai's Future Augmented Reality Looks Pretty Cool, 6 pages (Jan. 1, 2015). [Retrieved Online Aug. 15, 2018]. Available: https://www.carscoops.com/2015/01/hyundais-future-augmented-reality-looks/.

Paya, L. et al., A State-of-the-Art Review on Mapping and Localization of Mobile Robots Using Omnidirectional Vision Sensors, Journal of Sensors, vol. 2017, Article ID 3497650, 20 pages (Published Apr. 24, 2017). URL: https://www.hindawi.com/journals/js/2017/3497650/ [Retrieved Nov. 19, 2018].

Roger Russell, "roger-russell.com," 2004. [Online]. Available: https://web.archive.org/web/20050404140115/http://www.rogerrussell.com/project/project.htm. [Retrieved Aug. 20, 2018].

Shenton, Collectable Clocks, Illustration 306, Projection Clock/Night Clock (1909). [Online]. Available: https://web.archive.org/web/20041012014240/http://www.mueller-maerki.com:80/h-.

International Search Report dated Oct. 14, 2021, International Application No. PCT/EP21/56110 filed Mar. 10, 2021 (5 pages).

Written Opinion of the International Searching Authority dated Oct. 14, 2021, International Application No. PCT/EP21/56110 filed Mar. 10, 2021 (10 pages).

International Preliminary Report on Patentability for International Patent Application No. PCT/EP2021/056110, dated Sep. 29, 2022, 11 pages.

* cited by examiner

USING STATIC SCORES TO CONTROL VEHICLE OPERATIONS

TECHNICAL FIELD

This specification relates generally to example systems configured to use scores representing an element's likely mobility to control autonomous vehicle operations such as mapping, route planning, and navigation.

BACKGROUND

Autonomous vehicles, such as mobile robots, are configured to travel within a space, such as a warehouse. For example, an autonomous vehicle may create a map of the space and plan a route through the space. During movement along the route, the autonomous vehicle may determine its location within the space and use that location to control its future movements.

SUMMARY

An example system includes a sensor for obtaining information about an object in an environment and one or more processing devices configured to use the information in generating or updating a map of the environment. The map includes the object and boundaries or landmarks in the environment. The map includes a static score associated with the object. The static score represents a likelihood that the object will remain immobile within the environment. The likelihood may be between certain immobility and certain mobility. The example system may include on or more of the following features, either alone or in combination.

The one or more processing devices may be configured to use the map to plan a route through the environment based, at least in part, on the static score. Planning the route may include determining a path through the environment that avoids the object if the object has a static score that is below a predefined threshold. The route may include a segment containing the object and planning the route may include assigning a weight to the segment based, at least in part, on the static score of the object.

The system may include an autonomous vehicle configured to perform localization when traveling through the environment based, at least in part, on the static score. At least one of the sensor or a processing device among the one or more processing devices may be included on the autonomous vehicle. At least one of the sensor or a processing device among the one or more processing devices may not be included on the autonomous vehicle. Static scores may be associated with at least some of the boundaries or landmarks to indicate that the at least some of the boundaries or landmarks have certain immobility. Performing localization may include using the static scores of the least some of the boundaries or landmarks to determine a location of the autonomous vehicle within the environment. Performing localization may include using the static score of the object to determine a location of the autonomous vehicle within the environment.

The map may include multiple objects including the object. The map may include a static score associated with each of the multiple objects. The system may be or include a map generating system. The system may be or include a route planning system. Static scores may be associated with least some of the boundaries or landmarks that represent certain immobility. The system may include an autonomous vehicle configured to perform localization when traveling through the environment based, at least in part, on the static score. Operations to perform localization may include using the static scores of the least some of the boundaries or landmarks to determine first information about a location of the autonomous vehicle within the environment. Operations to perform localization may include, in a case that additional information is desired to establish the location of the autonomous vehicle within the environment, using the static score of the object to determine second information about the location of the autonomous vehicle within the environment. The second information may augment the first information to establish the location of the autonomous vehicle within the environment. The additional information may be desired to establish the location of the autonomous vehicle within the environment because the first information is insufficient to establish the location. Operations to perform localization may include using a particle filter to generate particles in the environment. The particles may correspond to potential locations for future travel of the robot. Each of the particles may be weighted. Operations to perform localization may include using the static score of the object to change a weight of at least one of the particles.

The static score of the object may be based, at least in part, on one or more times of day that the information is obtained. The static score of the object may be based, at least in part, on a location in the environment in which the object is located. The static score of the object may be based, at least in part, on a pose of the object within the environment. The static score may be based, at least in part, on data about the object provided from an external source.

The one or more processing devices may be configured to implement a machine learning system comprising a model that is trainable to adjust the static score based on one or more conditions that change over time. The system may include memory storing a database containing attributes of objects. The one or more processing devices may be configured to recognize the object based on the attributes in the database and to assign the static score based on recognition of the object. The static score associated with the object may be an updated version of an earlier static score assigned to the object. The updated version of the earlier static score may be based on detection of the object by the sensor at a later time than when the earlier static score was assigned.

The system may include an autonomous vehicle configured to perform localization when traveling through the environment based, at least in part, on the static score. The one or more processing devices may be on the autonomous vehicle and may include a first processing device to receive the information from the sensor; and a second processing device to recognize the object based on the information and to assign the static score to the object. The first processing device may be configured to generate the map. The second processing device may have at least one of a greater clock frequency or a longer word size than the first processing device.

The sensor may be part of a system that includes multiple sensors. The multiple sensors may include a light detection and ranging (LIDAR) sensor to detect first data representing the boundaries and a camera to detect second data representing the object. The information may include the second data. The one or more processing devices may be configured to use the first data to generate at least part of the map. The multiple sensors may include multiple LIDAR sensors including the LIDAR sensor and multiple cameras such as multiple 2D cameras or multiple 3D cameras.

The system may include an autonomous vehicle configured to perform localization when traveling through the environment based, at least in part, on the static score. The LIDAR sensor and the camera may be mounted on the autonomous vehicle and may be directed to view at least part of a same region in front of the autonomous vehicle in a direction of travel. At least one of the multiple sensors may be mounted in the environment and not on the autonomous vehicle. At least one of the multiple sensors may be mounted on a second autonomous vehicle that is different from the first autonomous vehicle.

The static score of the object may be changeable over time. The static score may have a value that is between a first value represent certain immobility of the object in the environment over a period of time and a second value representing certain mobility of the objecting in the environment within the period of time.

An example method is for use with an autonomous vehicle configured to operate within an environment. The method includes obtaining information about an object in an environment and using the information in generating or updating a map of the environment. The map includes the object and boundaries or landmarks in the environment. The map includes a static score associated with the object. The static score may represent a likelihood that the object will remain immobile within the environment. The likelihood may be between certain immobility and certain mobility. One or more non-transitory machine-readable storage media may store instructions that are executable by one or more processing devices on an autonomous vehicle configured to operate within an environment. The instructions may be executable to perform the method. The example method or instructions may include one or more of the preceding features, either alone or in combination.

Any two or more of the features described in this specification, including in this summary section, can be combined to form implementations not specifically described herein.

The example systems, vehicles, and processes described herein, or portions thereof, can be implemented using, or controlled by, a computer program product that includes instructions that are stored on one or more non-transitory machine-readable storage media, and that are executable on one or more processing devices to control (e.g., coordinate) the operations described herein. The example systems, vehicles, and processes described herein, or portions thereof, can be implemented using an apparatus or electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
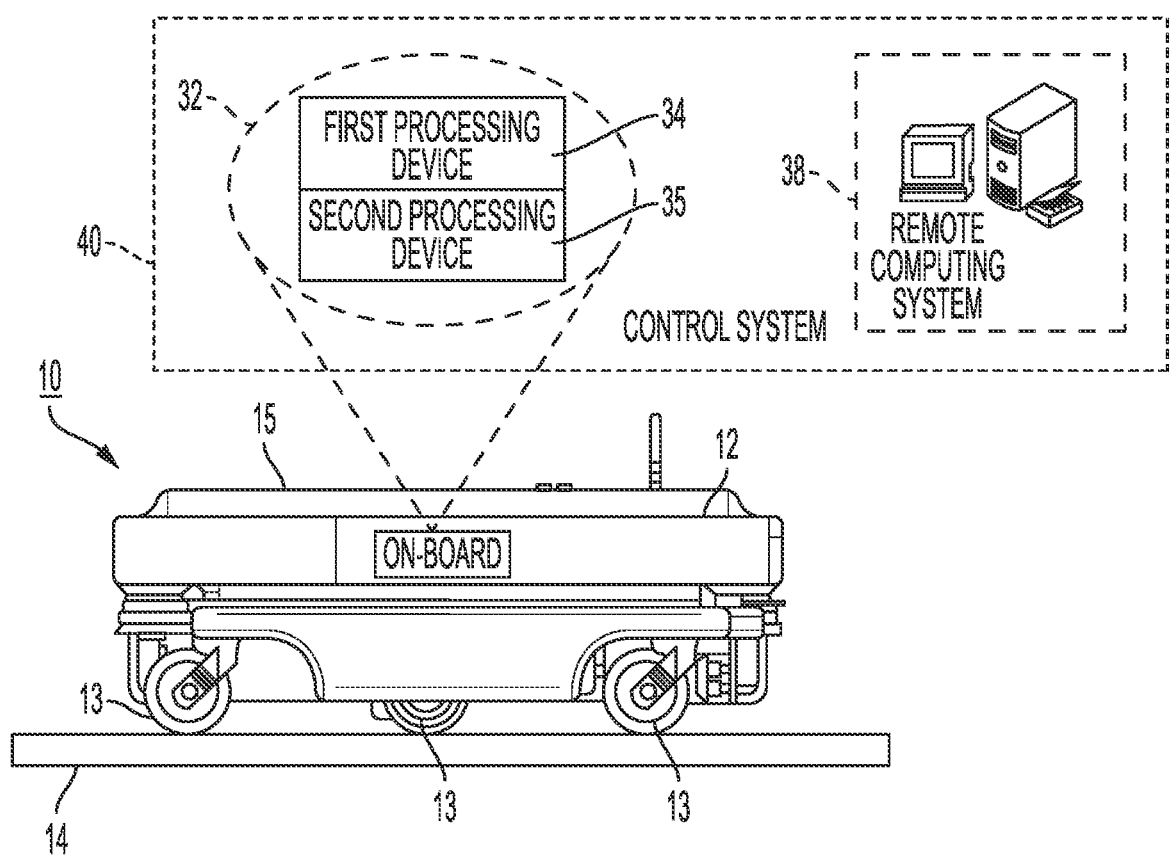
FIG. 1 is a side view of an example autonomous vehicle showing possible interior and exterior components of an example control system for the autonomous vehicle.

Described herein are example systems configured to use scores representing the level of mobility of environmental elements to control autonomous vehicle operations such as mapping, route planning, and navigation. Examples of such elements include boundaries of the environment such as walls or doorways, landmarks in the environment such as support columns and stairways, and objects in the environment that are, or are not, capable of movement such as boxes or furniture.

In this regard, in an environment such as a confined space, an element may be incapable of mobility or capable of mobility. Those elements that are incapable of mobility are highly static and are therefore assigned a high score. For example, a support column within a warehouse may be assigned a score indicating that the column is 100% static. In this example, the system may assign the column a "static score" of 1 indicating that the column is immobile and, therefore, 100% static. For objects that are capable of mobility either of their own accord or not, such as people or furniture, the system may assign a static score representing a likelihood that the object will remain immobile within the environment at least for a period of time.

In some examples, the static scores assigned to elements in a space are not binary, but rather are values representing something between certain immobility and certain mobility. For example, a container located on the floor of a warehouse may be assigned a static score indicating that the container is 60% likely to remain immobile at least for a period of time. In this example, the system may assign the container a static store of 0.6. Thus, the static score has a value that is between a first value such as 1 representing certain immobility and a second value such as 0 representing certain or expected mobility. System assignments of static scores may be based on external inputs or may be generated autogenously by the vehicle's control system.

The static scores may be incorporated into a map of the space. For example, elements such as objects, boundaries, and landmarks in the space are assigned static scores in the map based on a likelihood that they will remain immobile within the space. So, in the preceding example, the column is assigned a static score of 1 in the map and the container is assigned a static store of 0.6 within the space. These static scores may be associated with representations of the objects in the map.

The map is usable by a system for route planning. Route planning may include determining a route through the space to a destination. The static scores of elements in the space may inform the system which routes are preferred. For example, if a container is blocking one route of an autonomous vehicle, such as a mobile robot, to the destination, and its static score (0.8) indicates that the container is likely to remain in that route, then the system may determine that a different route through the space is preferred. Thus, in this example, the system takes into account elements in the space, their locations, and their static scores to determine the preferred route.

The static scores are also usable during localization—also referred to as navigation—within the space. In an example, after the preferred route is determined, a mobile robot ("robot") begins to move through the space along a route located on the map. During this movement, the robot periodically or intermittently determines its location, orientation, or both location and orientation within the space. This information allows the robot to confirm that it is on the route, to determine where it is on the route, and to determine if a course correction is necessary to reach the destination. The robot uses elements in the space to determine its location along the route by comparing the elements that it detects using one or more sensors to expected locations of those same elements on the map. In some implementations, the robot gives primacy during localization to elements that are deemed completely static based on their static scores (e.g., scores of 1). If, however, additional information is needed, the robot may use other elements having static scores that are less than 1. For example, the robot may use for localization elements having a static score that is less than 1, such as 0.6. In this example, the robot may also identify elements in the space, compare those elements to elements located on the map, and determine its location based also on those elements if those elements have static scores that exceed 0.6.

The preceding operations may be performed by the robot's control system. The control system may include hardware, software, or both hardware and software to implement a map generating system, a route planning system, and a localization system. In some implementations, all or part of the control system may be "on-board" in the sense that all or part of the control system is located on the robot itself. In some implementations, at least part of the control system may be remote in the sense that at least part of the control system is not located on the robot itself.

An example of a robot configured to operate based on static scores is robot 10 of FIG. 1. In this example, robot 10 is a mobile robot and is referred to as "robot 10" or "the robot". Robot 10 includes a body 12 having wheels 13 to enable robot 10 to travel across a surface 14, such as the floor of a warehouse, a factory, or other terrain. Robot 10 includes a support area 15 configured to support the weight of an object. In this example, robot 10 may be controlled to transport the object from one location to another location. Robot 10 includes various detectors—also referred to as sensors—for use in detecting elements in the vicinity of the robot. In some examples, an element may include animate objects, inanimate objects, boundaries, or landmarks.

In this example, robot 10 includes different types of visual sensors, such as three-dimensional (3D) cameras, two-dimensional (2D) cameras, and light detection and ranging (LIDAR) scanners. A 3D camera is also referred to as an RGBD camera, where R is for red, G is for green, B is for blue, and D is for depth. The 3D camera may be configured to capture video, still images, or both video and still images. Notably, the robot is not limited to this configuration or to using these specific types of sensors. For example, the robot may include a single sensor or a single type of sensor or more than two types of sensors.

Figure 2:
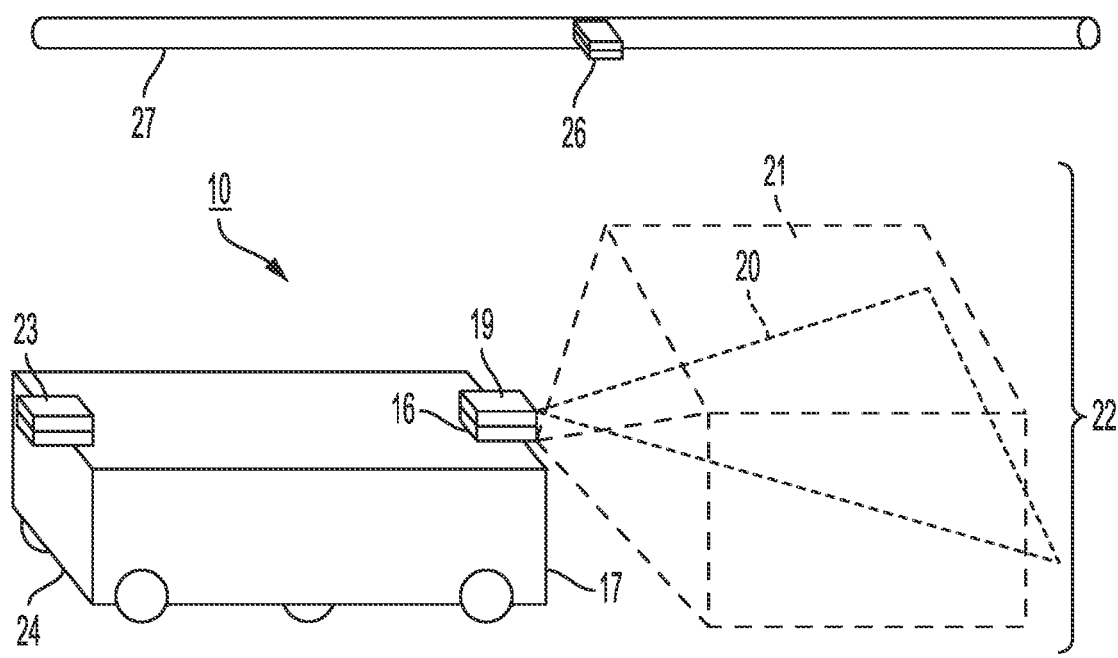
FIG. 2 is a perspective view of the example autonomous vehicle showing placement of sensors and examples of sensor ranges provided by those sensors.

Referring to FIG. 2, robot 10 includes 3D camera 16 at a front 17 of the robot. In this example, the front of the robot faces the direction of travel of the robot. The back of the robot faces terrain that the robot has already traversed. Robot 10 also includes LIDAR scanner 19 at its front. Since the LIDAR scanner is 2D, it will detect elements in a plane 20 in the space that the robot is controlled to traverse. Since the camera is 3D, it will detect elements in 3D volume 21 in the space that the robot is controlled to traverse. LIDAR scanner 19 is adjacent to, and points in the same general direction as, 3D camera 16. Likewise, 3D camera 16 is adjacent to, and points in the same general direction as, LIDAR scanner 19. For example, the LIDAR scanner may be just below the 3D camera or the 3D camera may be just below the LIDAR scanner as shown in the example of FIG. 2. In this configuration, both the 3D camera and the LIDAR scanner are configured to view at least part of a same region 22 in front of the robot during travel. The front of the robot may contain multiple 3D camera/LIDAR scanner combinations although only one is shown. Robot 10 may also include one or more 3D camera/LIDAR scanner combinations 23 at its back 24. Robot 10 may also include one or more 3D camera/LIDAR scanner combinations (not shown) on its sides. Each 3D camera/LIDAR scanner may be configured to view part of a same region.

A 2D camera may be used instead of, or in addition to, a 3D camera on robot 10. For example, for all instances described herein, one or more 2D cameras may be substituted for a 3D camera. To obtain 3D data of a region, two or more 2D cameras may be pointed at the same region and the captured 2D data correlated to obtain 3D data. In the example above, one or more 2D cameras and the LIDAR scanner may be are configured to view at least part of a same region 22 in front of the robot during travel. Likewise, 2D cameras may be at the back or sides of the robot.

In this regard, in some implementations, additional or substitute sensors may be used. For example, the robot may include one or more one-dimensional (single beam) optical sensors, one or more two-dimensional (2D) (sweeping) laser rangefinders, one or more 3D high definition LIDAR sensors, one or more 3D flash LIDAR sensors, one or more 2D or 3D sonar sensors, and/or one or more 2D cameras. Combinations of two or more of these types of sensors may be configured to detect both 3D information and 2D information in the same region in front, back, or on the sides of the robot.

One or more of the sensors may be configured to continuously detect distances between the robot and elements in a vicinity of the robot. This may be done in order to avoid collision and to guide the robot safely around or between detected objects along a route. While the robot is moving along a route, an on-board computing system may continuously receive input from the sensors. If an obstacle is blocking the trajectory of the robot, the on-board computing system is configured to plan a path around the obstacle. If an obstacle is predicted to block the trajectory of the robot, the on-board computing system is configured to plan a path around the obstacle.

The LIDAR scanners, the 3D cameras, and/or any other sensors on the robot make up a vision system for the robot. Visual data obtained by the vision system may be used to create a map of a space by moving the robot through the space. As noted, each mobile robot traveling through the space may include such a vision system and may contribute data, such as visual data, for use in creating the map.

Sensors such as 3D cameras, LIDAR scanners, or other types described herein may be mounted in areas that the mobile device is to travel. For example, such sensors may be mounted on walls, floors, ceilings, or other structures within an area and throughout routes that the robot may take between two or more locations. In FIG. 2, example sensors 26 are mounted on wall support beam 27. Information from these sensors not on the robot may contribute to creation of the map. For example, information from these sensors may be sent wirelessly to the robot's control system and may be used by the robot's control system to create the map or to update the map periodically, intermittently, sporadically, or in response to receipt of new data. In some implementations, upon encountering a sensor, an on-board component of the control system may query the sensor to obtain information about elements in its vicinity.

In some implementations, part of the map is created using data from the LIDAR sensors. In these implementations, at least part of the map be 2D. In some implementations, part of the map is created using data from the 3D cameras combined with data from the LIDAR sensors. In these implementations, at least part of the map is 3D. An example of a map containing 2D and 3D information is shown in FIG. 3.

An example control system for the robot implements operations associated with the robot, such as map generation, route planning, and localization. In some implementations, the control system stores the map of the space in computer memory ("memory"). The map may be stored in memory on each robot or at any location that is accessible to the control system and to the robot. For example, the map may be stored at a remote computing system, such as a fleet management system. For example, the map may be stored at a remote server that is accessible to the robot, the control system, and/or the fleet management system. In some examples, remote access may include wireless access, such as access via a computer network or direct wireless link.

Figure 3:
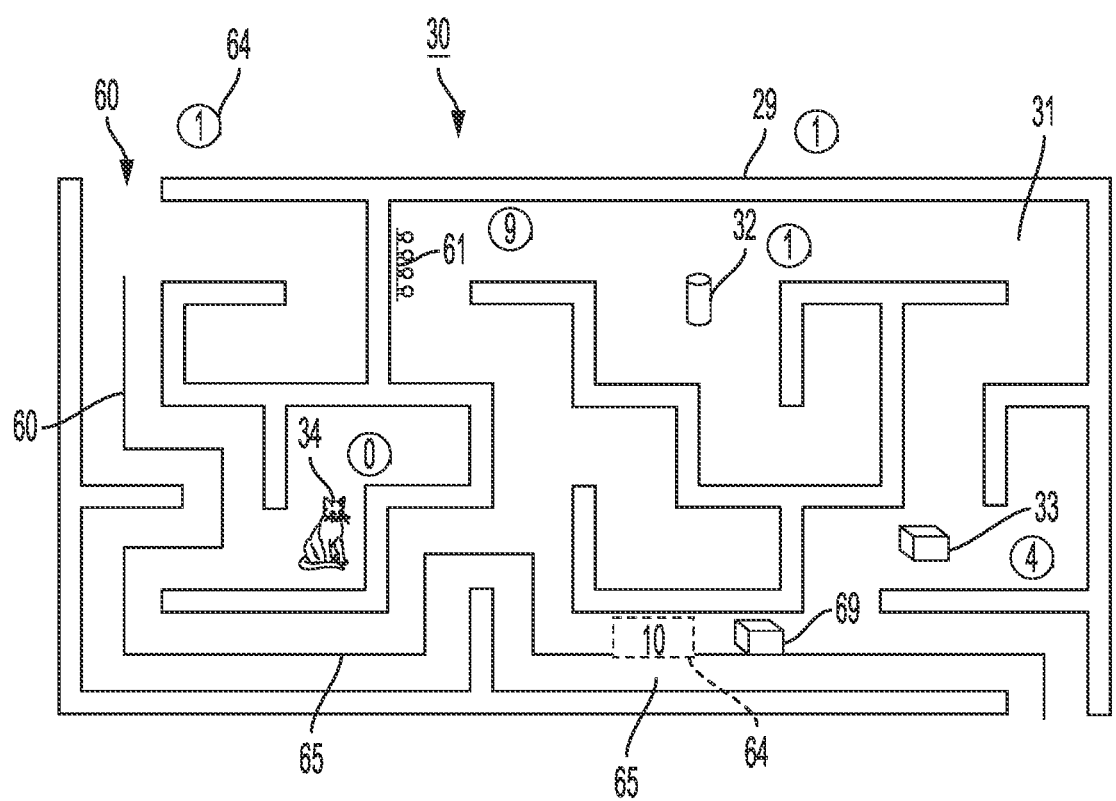
FIG. 3 is a top view of an example map that may be used for route planning and navigation by an autonomous vehicle traveling through a space.

Referring to FIG. 3, map 30 may define boundaries of a space 31 traveled through by the robot, such as walls 29 and doorways. The map may include locations of landmarks, such as columns 12, corners, windows, poles, and other distinguishable permanent and non-permanent features of the space that act as references for the robot during localization. The map may include objects, such as goods, containers 33, humans, or animals 34 within the space. The map also may also include measurements indicating the size of the space, measurements indicating the size and locations of the objects, boundaries, and landmarks, measurements indicating distances between different objects, boundaries, and landmarks, and coordinate information identifying where the objects, boundaries, and landmarks are located in the space.

As noted, in some implementations, each robot may store its own copy of the map locally. Information obtained from sensors on and/or off of the robot may be used to adjust static scores of elements on the map. In some implementations, a remote control system may transmit, to the robot, updates to the map, an entire new map containing updates, or information identifying a selected route independent of the map. A processing device on the robot may receive that information and use that information to update the map and/or to control its movement along a selected route.

Referring to FIG. 1, in some examples, the control system may include on-board components 32, such as on-board circuitry, an on-board computing system, or an on-board controller to implement map generation, route planning, and localization, along with other operations of the robot. The on-board components may include, for example, one or more processing devices such as one or more microcontrollers, one or more microprocessors, programmable logic such as a field-programmable gate array (FPGA), one or more application-specific integrated circuits (ASICs), solid state circuitry, or any appropriate combination of two or more of these types of electronic components.

In some implementations, on-board components of the control system may include a first processing device 34 to receive information from sensors and to generate the map based, at least in part, on that information. The on-board components may also include a second processing device 35 to receive sensor information from the first processing device, to recognize elements in the space/environment based on the information, and to generate and assign static scores to all or some of the elements. These static scores are then sent to the first processing device for inclusion in the map. In this regard, the second processing device is configured to perform any machine learning or artificial intelligence processes described herein to produce the static scores. The first processing device may be a first microprocessor and the second processing device may be a second microprocessor having a greater clock frequency or word size than the first microprocessor. More generally, in some implementations, the second microprocessor may be more powerful than the first microprocessor. In some implementations, the first processing device and the second processing device may be two different cores within a single microprocessor. In some implementations, the functionality attributed to the first processing device and the second processing device may be performed by a single microprocessor or other single-die device.

In some implementations, on-board components of the control system may communicate with a remote computing system 38, such as a fleet management system. The computing system is remote in the sense that it is not included on the robot. Components of the remote computing system may be at the same geographic location or distributed, for example, across different geographic locations. Components of the remote computing system may be distributed among different robots in the space. In an example, commands provide by the remote computing system may be transferred for execution by a robot's on-board components. In some implementations, the control system includes only on-board components 32. In some implementations, the control system 40 includes a combination of on-board components 32 and the remote computing system 38.

The on-board or remote components of the robot's control system may be configured to receive inputs from a user, either manually or wirelessly. In some implementations, the control system may be configured—for example programmed—to implement control functions, such as map generation, route planning, and localization, absent either local or remote input from a user. In some implementations, the control system may be configured to implement control functions, such as map generation, route planning, and localization, based at least in part on input from a user.

Thus, to summarize, the robot's control system 40 may be located on the robot itself, distributed across various locations or devices, or located remotely from the robot at a stationary location. The control system may be implemented using one or more processing devices 34, 35 on the robot. The control system may be implemented using one or more processing devices on the robot and on one or more other robots (not shown) that are traveling or have traveled in the same space as the robot. The control system may be implemented using one or more processing devices at a stationary location separate from all robots in the space. The control system may be implemented using one or more processing devices that are on the robot, on one or more other robots, and/or at the stationary location.

A fleet management system, which may be implemented on remote computing system 38, may be configured to control one or more robots and to perform at least some of the functions described herein. The fleet management system and each of the robots may include a copy of, or have access to, the same map of the space. The fleet management system may be configured to receive updated information about the actual position and operational status of each robot in a fleet of robots and to receive prioritized operation and transport requests from a user. The fleet management system may be configured to perform global route planning for the entire fleet and to send driving or operational instructions to all or some mobile robots within the fleet.

In some implementations, the control system may be configured to process commands from an external source, such as enterprise resource planning (ERP) system. In some implementations, the control system, the robots, and the sensors may communicate over a wireless communication system, such as Local Area Network (LAN) having Wi-Fi, ZigBee, or Z-wave. Other networks that may also be used for communication between the control system, the robots, and the sensors include, but are not limited to, LoRa, NB-IoT (NarrowBand Internet of Things), and LTE (Long Term Evolution). The control system may include application programmable Interface (API) through which other systems can interact with the control system.

Figure 4:
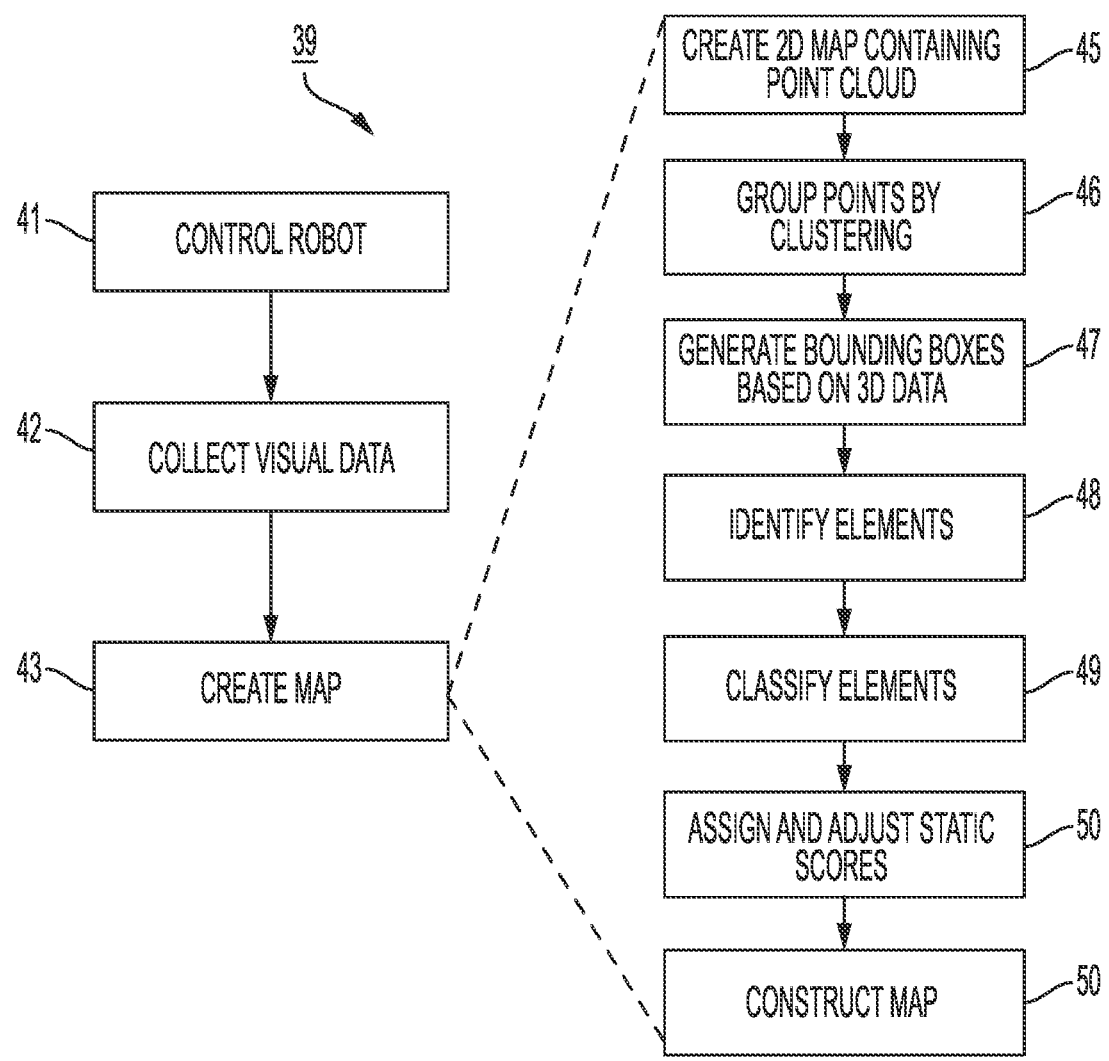
FIG. 4 is a flowchart showing operations that may be included in an example process for generating the map.

As noted operations performed by the control system include map generation, route planning, and localization. Map generation may be performed by a map generating system implemented at least in part by hardware and/or software in the control system. Referring to process 39 of FIG. 4, in some implementations to create a map of a space, such as warehouse or factor, a robot is controlled (41) to travel throughout the space. Since the robot does not know the space initially, the robot may be controlled manually to move through all potential routes through the space. For example, a user may guide the robot remotely. While the robot moves, the robot's visions system collects (42) visual data representing its surroundings. Data from the robot's vision system is received by the control system, which uses that data to generate (43) a map of the space. During operation, if the robot cannot move around an element in its path, the robot may be controlled to move around the element or to back-track and appropriate information indicating this situation may be stored. If the robot can move around the object, the robot may be controlled to move around the object, but still store the information. In some implementations, stationary or mobile sensors mounted throughout the space that are not on the robot may contribute visual data for the map by sending data from those sensors to the control system. In some implementations, user input data may also contribute to the content of the map.

In an example, while the robot is moving through the space, the robot's on-board LIDAR system senses distances to elements such as objects, boundaries, and landmarks in a plane in the space. Input from the LIDAR system is transferred to the control system, which is configured—for example programmed—to create (45) a 2D map of the space. In this example, the map includes a point cloud representing the space. In some examples, a point cloud includes a set of data points in space. The LIDAR scanner measures many on the external surfaces of objects that it encounters and arranges the points relative to each other on the map.

In this example, information about the objects, boundaries, and landmark is based on 2D LIDAR data, which may make it difficult to identify the elements with sufficient particularity. Operations, however, may be performed to distinguish these elements. For example, to distinguish these elements, an area of the point cloud having greater than a specified density of points may be identified and deemed to correspond to the location of a part of an element or an edge of an element. Different areas of the point cloud having the requisite densities may be grouped (46) by clusters. Clustering may be performed using properties such as distances between points. For example, sufficiently large gaps in the points indicate that two elements are not part of the same cluster. Clustering may also be performed using line segments. Line segments may be identified in the point cloud by identifying points that are linearly arranged. Linearly-arranged points may be deemed to be part of the same cluster.

As explained previously, the robot may include a color video system that includes one or more 3D cameras, which are arranged to capture images of the space while the robot is traveling. The 3D cameras may be configured to capture 3D information representing the space, and to send that 3D information to the control system. A 3D camera may detect one or more characteristics of an element. Example characteristics include features that are attributable to a particular type or class of element. For example, the 3D camera may be configured to detect one or more characteristics indicating that the object is an animate object, such as a human or an animal. For example, the 3D camera may be configured to detect one or more characteristics indicating that the object is a known object, such as a robot. The control system may be configured to detect objects, boundaries, and landmarks in the space based, at least in part, on these characteristics. For all or some of these objects, boundaries, and landmarks, the control system may be configured to generate (47) 3D visual bounding boxes representing edges of volumes that are captured by the 3D camera.

Data representing the point clusters and bounding boxes is used by the control system to identify (48) elements with the space. For example, the point clusters and the bounding boxes may be correlated to identify locations where point clusters coincide with bounding boxes. These locations may represent the locations of elements in the space. The 3D data defines attributes of those elements, such as shapes and orientations. Other attributes that may be identified include, but are not limited to, features or characteristics of an element such as its size, color, structure, weight, mass, density, location, environment, chemical composition, temperature, scent, gaseous emissions, opacity, reflectivity, radioactivity, manufacturer, distributor, place of origin, functionality, communication protocol(s) supported, electronic signature, radio frequency identifier (RFID), compatibility with other devices, ability to exchange communications with other devices, mobility, and markings such as bar codes, quick response (QR) codes, and instance-specific markings such as scratches or other damage. The resulting location and attribute data may be compared to information in a stored library of predefined attributes that are generic or specific to the space. Upon detecting a match between a point cluster and bounding box combination and an element from the library, the control system classifies (49) the element represented by point cluster and bounding box combination as the matching element from the library. For example, if a point cluster and bounding box combination match a support column in the library, the point cluster and bounding box combination is classified as a support column. For example, if a point cluster and bounding box combination match a container in the library, the point cluster and bounding box combination is classified as the container. An exact match may be required or only a partial match of features may be required.

In some implementations, the library may include one or more look-up tables (LUTs) or other appropriate data structures that are used to implement the comparison. For example, the library and rules may be stored in the form of a machine leaning model such as, but not limited to, fuzzy logic, a neural network, or deep learning. The stored attributes may include attributes for different types of elements, such as animate objects, inanimate objects, boundaries, landmarks, and other structures. The attributes are compared to the stored attributes for different elements. The stored attributes that most closely match the identified element indicate the type of the element. In some implementations, a match may require an exact match between some set of stored attributes and element attributes. In some implementations, a match may be sufficient if an element's attributes are within a predefined range of the stored attributes. For example, element attributes and stored attributes may be assigned numerical values. A match may be declared between an element's attributes and the stored attributes if the numerical values match identically or if the numerical values are within a certain percentage of each other. For example, a match may be declared if the numerical values for the element's attributes deviate from the stored attributes by no more than 1%, 2%, 3%, 4%, 5% or 10%, for example. In some implementations, a match may be declared if a number or recognized features are present. For example, there may be a match if three or four out of five recognizable features are present.

In some implementations, the attributes may be weighted based on factors such as importance. For example, shape may be weighted more than other attributes, such as color. So, when comparing the element's attributes to the stored attributes, shape may have a greater impact on the outcome of the comparison than color.

Following classification, the control system may assign (50) an initial static score to the classified element—for example, an object, boundary, or landmark. The static score may be assigned based on user input or on input from an external source such as another robot or computing system. In an example, a user may be prompted to assign a static score to the element. For example, the static score may be assigned by the control system without user input by referencing a stored database of elements and expected or default static scores for such elements. The database may contain information about the expected static scores for different types of element. The control system may identify the element in the database and retrieve the static score therefor. Examples of static scores include 1 for elements such as boundaries or landmarks that are certain or almost certain not to move (e.g., 100% static); 0 for elements such as people or animals that are almost certain to move over a period of time (e.g., 0% static); and values between 0 and 1 for objects that may move or may not move based on their likelihood of moving or not moving. For example, some elements such as goods or containers may be assigned a static score of 0.5 indicating that there is a 50% chance that the element might move. For example, some elements such as parked cars may be assigned a static score of 0.2 indicating a likelihood that they there is a 20% chance that they will move within a period of time. That period of time may be predefined or configurable and may affect attribution of the static scores.

The static score from the database that is assigned to an element may be adjusted (50) based on the location of the element within the space, the time that the element was detected, or a combination of these and other factors. For example, goods detected in an area of a space known to be a storage area may be assigned a higher static score than those same goods detected in an area of the space that is not a known storage area. For example, goods detected in a warehouse during normal working hours may be assigned a lower static score than those same goods detected in the same location outside of standard working hours. The presumption here is that, outside of standard working hours, the goods have been placed for storage.

The static score from the database that is assigned to an element may also be adjusted based on the pose of the element in a space. In an example, the pose of an element includes orientation, position, or both orientation and position of the element. For example, a rectangular box in a stack of rectangular boxes and in alignment with other rectangular boxes in the stack may be assigned a higher static score than an identical rectangular box detected at a same time and in a same or comparable location but not in alignment with other rectangular boxes in a stack.

In some implementations, the control system may include machine learning or artificial intelligence (AI) software that is configured to recognize and to classify elements within the space. For example, the software may be configured to receive an input static score for an object in the space. This initial static score may be received from the database described previously or from user input. The software may be configured to adjust the static scores of the object based on observations of similar objects, in similar or different locations, at similar or different time periods, or in similar or different poses. For example, a robot may detect a first box against a wall in a high-traffic area of a factory. Initially, because the first box is in a high-traffic area, the first box is assigned a low static score, meaning that it is likely that the first box will be moved. This assignment may be based on input from the database and an initial evaluation of conditions existing for the first box. The robot may, over time, continue to detect the first box in the same space and at different times, including both during and after working hours. This information may be added to a model that is part of the software used to determine and to assign static scores to elements in the space. The model may be trainable to adjust static scores based on one or more such conditions that change over time. Accordingly, when an identical or similar second box is detected in a high-traffic area but up against a wall, the software may assign the second box a higher static score based on the behavior of the first box that was detected.

The map may be constructed (51) using the elements detected and their static scores. Referring back to FIG. 3, map 40 includes elements such as objects 33 and 34 (a box and a cat, respectively), boundaries 29 and 60 (a wall and a doorway, respectively), and landmarks 32 and 61 (a support column and a light fixture, respectively). Each element in the map may include—for example, have stored in association with—identification information such as the type of the element, attributes of the element, and so forth. Each element in the map is also associated with a static score 64. The static scores of each element may be stored in association with representations and/or locations or expected locations of the elements on the map. In this example, the static score of each element is depicted in a circle next to the reference number for that element. As noted, the static score represents a likelihood that an element such as an object, a boundary, or a landmark will remain immobile within the space. The likelihood may be between certain (or definite) immobility and certain (or definite) mobility forever or over a period of time. Boundaries 29 and 60 are assigned static scores of 1 in this example; landmark 32 is assigned a static score of 1 in this example and landmark 61 is assigned a static score of 0.9 in this example; and cat 34 is assigned a static score of 0 in this example and box 33 is assigned a static score of 0.4 in this example. In some implementations, static scores may range over a continuum between 0 indicating certain mobility (such as a cat) and 1 indicating certain immobility (such as a wall). In two other examples now shown in the map, a pallet located in a stack of pallets may be assigned a static score of 0.9 and a box in the middle of a walkway may be assigned a static score of 0.3.

In some implementations, the map, including the static scores of elements on the map may be updated periodically, intermittently, sporadically, or in response to newly-received data. For example, a robot may traverse the space at a first time to generate the map. During this traversal, the robot identifies a box on a walkway. For reasons described previously, the robot assigns the box a low static score. However, at a second time—for example, one month after the first traversal—the robot identifies the same box on the same walkway. Assuming that the space has remained in use during that period, the robot adjusts the static score of the box and initiates a corresponding update of the map. For example, at or following that later time, the robot may change the static score of the box from 0.3 to 0.7, and communicate that change to the control system, which updates the map accordingly. The map may then be distributed to, or available to, the robot and other robots that may use the map to traverse the space.

In some implementations, the map can be transferred to a single robot or to multiple—for example, all—robots operating in a space defined by the map and controlled by the control system. Accordingly, any behavior dictated by the map may, in some examples, apply to multiple robots in the space.

In some implementations, the static scores of objects may be used to characterize segments of the map. For example, if an object having a high static score is present in a segment of a map, the segment may be weighted to indicate that that segment is potentially unattractive due to a likely obstacle in the path that likely will not move. In some implementations, segments that are weighted higher are less attractive and in some implementations segments that are weighted lower are less attractive. The weighting may take into account the presence of multiple objects located along the route that may act as obstacles. To generate the weight, the static scores of those objects may be combined, for example, summed. The resulting combined static scores, along with positions of the objects and the likelihood of the robot being able to move around the objects may be taken into account when determining segment weight.

Referring to FIG. 3, map 30 includes a weight 64 on a segment 65 of route 66 through map 30. In some examples, a segment includes a straight line path through the route (e.g., having no turns). In this example, the weight is "10". This weight may indicate the presence of an object in that route having a high static score. The weight is not the static score in this example, but rather may be based on the static score. In this example, at least part of the weight may be attributed to the presence of box 69 on segment 65. The weight of the segment may make a route containing that segment less attractive and therefore less likely to be selected by a control system when planning robot movement between an origin and a destination.

In this regard, as noted, operations performed by the control system include route planning. Route planning may be performed by a route planning system implemented at least in part by hardware and/or software in the control system.

The control system may use map such as map 30 containing static scores to perform route planning. For example, the control system may access the map and may use the map to determine the distances and/or estimated travel times for potential routes between an origin and a destination on the map. The control system may determine which of the potential routes best meets a preferred metric, such as shortest distance, shortest travel time, or both, and select that route. The static scores of elements on the map may influence which route is selected. For example, an object blocking a first route may be characterized as highly-static (for example, it has a static score of 0.9) and an object blocking a second route may be characterized as likely dynamic (for example, it has a static score of 0.2). All else being equal or within acceptable limits, the control system will select the second route over the first route.

In some implementations, route planning takes into account elements on the map having static scores that exceed a threshold and ignores elements on the map having static scores that are below the threshold. In this example, the control system is configured to select a route based on the elements having the static scores that exceed the threshold and that also meet preferred distance and time constraints. If there are objects in the route that have static scores that are below the threshold, the robot may be configured to avoid those objects while traveling over the route as described herein. For example, route planning may plan routes using only elements having static scores of 0.9 or greater and ignore all other elements. In addition to elements having static scores of 0.9 or greater, other factors unrelated to static scores may be considered when planning a route on a map between a source and destination.

In some implementations, route planning takes into account all elements on the map regardless of static score. For example, the control system may be configured to take into account all elements along a route, within an area that includes multiple routes, or within an area that is part of a route. The control system is configured to use the static scores of elements on the map to determine whether to select a route on the map based, for example, on the likelihood that the route will be blocked. In the example presented above, assuming all else such as distance and travel time are within acceptable limits, the control system will select the route containing the object having the static score of 0.2 over the route containing the object having the static score of 0.9. In some implementations, the static scores of objects blocking a route may remove that route from consideration. For example, if a first route is shorter in terms of distance and travel time, but the first route is blocked by an object having a high static score, the first route may be rejected and a second route that is longer in terms of distance and travel time may be selected over the first route. If objects move into the route that is ultimately selected and that block the path of the robot, the robot may be configured to avoid those objects while traveling over the route as described herein. If objects move into the route that is ultimately selected and that block the path of the robot, the robot may be re-routed during travel as described herein.

In some implementations, the control system may be configured to determine the probability that one or more potential routes are blocked and the consequences of choosing among those routes or among different routes. In an example, the control system may be configured to select a shortest route that is through a tunnel. But, an object having a static score of 0.5 blocks the end of the tunnel. In this case, there is a 50% chance that the shortest route will be available and a 50% chance that the shortest route will be blocked. Replanning and rerouting will be necessary if the route through the tunnel is selected and the tunnel is in fact blocked. An alternative route is longer but has a smaller chance of being blocked or any blockage may be easier to circumvent than the blockage at the end of the tunnel. The control system may be configured to perform a cost-benefit analysis to determine whether the benefits of attempting the shortest route through the tunnel outweigh the costs that will incur for replanning and rerouting if the shortest route is taken but blocked. If the benefits outweigh the costs, then the robot may be instructed to travel along the shortest route; otherwise, the robot will be instructed to travel along the longer route. In other words, if the benefits outweigh the costs, then the shortest route will be selected; otherwise, the longer route will be selected.

As noted, in some implementations, a route may have one or more weights stored on the map. Each segment of the route may be weighted or an overall weight may be generated for the route. In an example, a weight represents a level of difficulty associated with traversing the route. In an example, a greater weight may be indicative of a greater level of difficulty in traversing the route. In another example, a lower weight may be indicative of a greater level of difficulty in traversing the route. The weight may be based on a variety of factors, such as the length of the route, the incline of the route, and the material included on the surface of the route. The weight of each route may also be based on the static scores of objects located along the route, such as objects that may block the route. For example, objects blocking a segment of the route that have low static scores such as scores less than 0.3 may contribute less to the overall weight of the segment than objects that have high static scores such as scores over 0.7. The weights may be adjusted over time as the static scores of objects change and/or as objects move into or out of the path of travel along the route.

A local route planning system may, in some examples, have more complete or up-to-date information to make planning decisions than a global or fleet management system. Accordingly, in some implementations, the local route planning system may take precedence over a fleet management system when implementing route planning.

In some cases, routes may be temporarily occupied by other mobile robots, other vehicles, people, or static objects. In order to reduce the likelihood of an object blocking the robot, the map may include information containing driving constraints, such as a width of a doorway, a gate, or a pathway. The fleet management system can be configured to plan and to schedule individual routes of each mobile robot within the fleet in a way that avoids or at least reduces the chances that the two mobile robots in the same fleet have to pass each other along passages that may be too narrow to accommodate both robots—for example, side-by-side. This may be implemented using visual data from sensors in the robot vision systems described previously.

As noted, operations performed by the control system include localization. Localization may be performed by a localization system implemented at least in part by hardware and/or software in the control system. Localization includes the robot traveling along a planned and selected route and determining its current location in order to continue along its current trajectory or make a course correction.

As explained previously, in some implementations, the robot implements localization by scanning its surroundings and comparing detected elements in a space to content on the stored map. If there is exact match or a match within a predefined tolerance between the detected elements and the content of the map, the robot can determine its current position and take further action such as continue along its current trajectory or make a course correction. In a dynamic environment, it may be difficult to obtain enough matches between elements in the environment and content of the map. In such cases, the robot may be unable to determine its current position within the space and, as a result, may be restricted from further autonomous movement.

In this regard, in some implementations, localization performed by the robot may include scanning the space and comparing detected elements only to elements on the map that have static scores that exceed a predefined threshold, such as 0.9. If the information obtained as a result of this comparison is sufficient to enable the robot to determine its current location relative to the map, then no further action need be taken. For example, if the robot can perform a triangulation using three identified elements in the map having static scores that exceed the predefined threshold, that may be sufficient information for the robot to determine its current location. However, if the information obtained as a result of this comparison is not sufficient to enable the robot to determine its current location relative to the map, the static scores threshold may be lowered and the robot may compare detected elements only with elements on the map that have static scores that exceed the lowered threshold. For example, the robot may compare detected elements with elements on the map that have static scores that exceed 0.7 (instead of 0.9). This process of comparing, determining, and lowering the threshold if necessary may be continued until the robot obtains enough information to determine its current location relative to map.

In some implementations, the robot may enter an area where there are an insufficient number of elements that have static scores that exceed a predefined threshold, such as 0.9. In this case, the preceding operations may be performed to reduce the threshold, determine if there is enough information obtained using the reduced threshold and, if not, reduce the threshold again and repeat these operations. This process may be performed multiple times until sufficient information is obtained by the robot to determine its current location on the route relative to the map.

In some implementations, a robot may implement different behaviors for different types of objects. Example behaviors include, but are not limited to, selecting a new route, moving around an object in a path, or waiting for a time for the object to move out of the path before proceeding along the path. A behavior for a particular type of object may be learned using artificial intelligence, machine-learning techniques, or may be obtained from user input. Different types of behaviors can also be implemented based on whether the system detected a known or unknown object.

Figure 5:
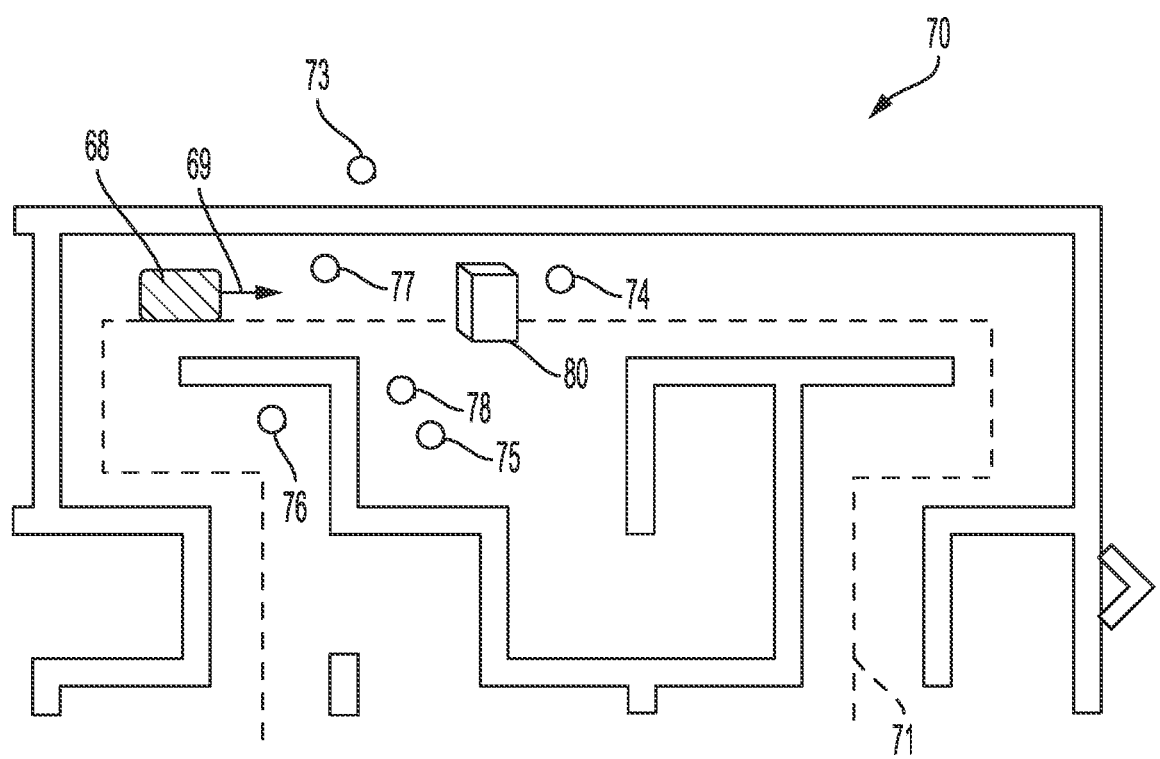
FIG. 5 is a top view of a part of the example map of FIG. 3.

In some implementations, during movement through the space along a planned route, the control system may generate virtual particles ("particles") that are arranged in a virtual representation of the environment. A particle filter executing on the control system may be configured to generate and to arrange these particles. The particles correspond to potential locations for future travel of the robot and, at least in part, are used to control the robot's direction of travel. The particles may be located, or not located, along the selected route. FIG. 5 shows an example of a part 70 of map 30 and a portion of a selected route 71 through that map. In this example, robot 68 has been planned to travel in the direction of arrow 69 along route 71. However, since planning occurred, box 80 has been moved into the path of the robot along route 71. During localization, the robot's control system generates particles at potential travel points from the robot's current position. Each of the particles may be weighted. The weights may represent a desirability or an availability of a point to which the robot can travel. For example, a high weight (e.g., 100) may indicate a desirable point to which to travel and a low weight (e.g., 1) may indicate an undesirable point to which to travel. For example, a particle 77 along route 71 planned for the robot will weighted greater than particle 73 that is off the route and behind a wall. The static scores of objects may be used to change the weights of one or more such particles and therefore affect movement of the robot, at least partly. For example, box 80 having a high static score may block the robot's path along route 71. Thus, a particle 74 positioned behind the box relative to the robot will become a less attractive point to which the robot can travel directly (e.g., without avoiding an obstacle, in this case, box 80). Accordingly, the weight of particle 74 may be decreased, thereby reducing the chances that the robot will be controlled to travel to that point. Conversely, particle 78 will become a more attractive point to which to travel directly, since particle 78 is not blocked by the box, since the robot can reach particle 78, and since particle 78 represents a path around box 80. Accordingly, the weight of particle 80 may be increased, thereby increasing the chances that the robot will be controlled to travel to that point.

The example robots and systems described herein may include, and the processes described herein may be implemented using, a control system comprised of one or more computer systems comprising hardware or a combination of hardware and software. For example, a robot, the control system, or both may include various controllers and/or processing devices located at various points in the system to control operation of its elements. A central computer may coordinate operation among the various controllers or processing devices. The central computer, controllers, and processing devices may execute various software routines to effect control and coordination of the various automated elements.

The example robots and systems described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the robot can be performed by one or more programmable processors executing one or more computer programs to perform the functions described herein. At least part of the robot can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

In the description provided herein, the adjectives "first", "second", "third", and the like do not designate priority or order. Instead, these adjectives are used solely to differentiate the nouns that they modify.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
 a sensor for obtaining information about an object in an environment; and
 one or more processing devices configured to perform operations comprising:
   using the information in generating or updating a map of the environment, the map comprising the object and boundaries or landmarks in the environment, the map comprising a static score associated with the object, the static score representing a likelihood that the object will remain immobile within the environment, the likelihood being between certain immobility and certain mobility;
   planning a route through the environment using the map, the route comprises a segment containing the object, where the route is planned based on a weight assigned to the segment, the weight being based on the static score associated with the object, and
   after planning the route, controlling an autonomous vehicle while the autonomous vehicle is on the route, where controlling the autonomous vehicle comprises performing localization along the route based on static scores associated with objects along the route and where localization comprises determining location, orientation, or both location and orientation of the autonomous vehicle within the environment.

2. The system of claim 1, wherein planning the route comprises determining a path through the environment that avoids the object if the object has a static score that is below a predefined threshold.

3. The system of claim 1, further comprising the autonomous vehicle.

4. The system of claim 3, wherein at least one of the sensor or a processing device among the one or more processing devices is included on the autonomous vehicle.

5. The system of claim 3, wherein static scores are associated with at least some of the boundaries or landmarks to indicate that the at least some of the boundaries or landmarks have certain immobility; and
 wherein performing localization comprises using the static scores of the least some of the boundaries or landmarks to determine a location of the autonomous vehicle within the environment.

6. The system of claim 5, wherein localization gives primacy to objects that are deemed completely static based on static scores of the objects.

7. The system of claim 1, wherein the map comprises multiple objects, the object being among the multiple objects, the map comprising a static score associated with each of the multiple objects.

8. The system of claim 1, wherein the system comprises a map generating system.

9. The system of claim 1, wherein the system comprises a route planning system.

10. The system of claim 1, wherein static scores are associated with least some of the boundaries or landmarks that represent certain immobility; and
wherein the autonomous vehicle is configured to perform localization when traveling along the route, where operations to perform localization comprise:
using the static scores of the least some of the boundaries or landmarks to determine first information about a location of the autonomous vehicle within the environment; and
in a case that additional information is desired to establish the location of the autonomous vehicle within the environment, using the static score of the object to determine second information about the location of the autonomous vehicle within the environment, the second information augmenting the first information to establish the location of the autonomous vehicle within the environment.

11. The system of claim 10, wherein the additional information is desired to establish the location of the autonomous vehicle within the environment because the first information is insufficient to establish the location.

12. The system of claim 1, further comprising the autonomous vehicle;
wherein static scores are associated with at least some of the boundaries or landmarks that represent certain immobility; and
where localization comprises:
using a particle filter to generate particles in the environment, the particles corresponding to potential locations for future travel of the autonomous vehicle, each of the particles being weighted; and
using the static score of the object to change a weight of at least one of the particles.

13. The system of claim 1, wherein, the static score of the object is based, at least in part, on one or more times of day that the information is obtained.

14. The system of claim 1, wherein the static score of the object is based, at least in part, on a location in the environment in which the object is located.

15. The system of claim 1, wherein the static score of the object is based, at least in part, on a pose of the object within the environment.

16. The system of claim 1, wherein the static score is based, at least in part, on data about the object provided from an external source.

17. The system of claim 1, wherein the one or more processing devices are configured to implement a machine learning system comprising a model that is trainable to adjust one or more of the static scores based on one or more conditions that change over time.

18. The system of claim 1, further comprising:
memory storing a database containing attributes of objects;
wherein the one or more processing devices are configured to recognize the object based on the attributes in the database and to assign the static score to the object based on recognition of the object.

19. The system of claim 1, wherein the static score associated with the object is an updated version of an earlier static score assigned to the object, the updated version of the earlier static score being based on detection of the object by the sensor at a later time than when the earlier static score was assigned.

20. The system of claim 1, further comprising the autonomous vehicle;
wherein the one or more processing devices are on the autonomous vehicle, the one or more processing devices comprising:
a first processing device to receive the information from the sensor; and
a second processing device to recognize the object based on the information and to assign the static score to the object;
wherein the first processing device is configured to generate the map, and wherein the second processing device has at least one of a greater clock frequency or a longer word size than the first processing device.

21. The system of claim 1; wherein the sensor is part of a system comprising multiple sensors, the multiple sensors comprising:
a light detection and ranging (LIDAR) sensor to detect first data representing the boundaries; and
a camera to detect second data representing the object, the information comprising the second data; and
wherein the one or more processing devices are configured to use the first data to generate at least part of the map.

22. The system of claim 21, wherein the multiple sensors comprises:
multiple LIDAR sensors including the LIDAR sensor; and
multiple cameras including the camera.

23. The system of claim 21, further comprising the autonomous vehicle to perform the localization when traveling along the route;
wherein the LIDAR sensor and the camera are mounted on the autonomous vehicle and are directed to view at least part of a same region in front of the autonomous vehicle in a direction of travel.

24. The system of claim 21, wherein at least one of the multiple sensors is mounted in the environment and not on the autonomous vehicle.

25. The system of claim 21, further comprising the autonomous vehicle configured to perform the localization when traveling along the route, the autonomous vehicle being a first autonomous vehicle; and
wherein at least one of the multiple sensors is mounted on a second autonomous vehicle that is different from the first autonomous vehicle.

26. The system of claim 1, wherein the static score of the object is changeable over time.

27. The system of claim 1, wherein the static score has a value that is between a first value represent certain immobility of the object in the environment over a period of time and a second value representing certain mobility of the objecting in the environment within the period of time.

28. A method for use with an autonomous vehicle configured to operate within an environment, the method comprising:
obtaining information about an object in an environment;
using the information in generating or updating a map of the environment, the map comprising the object and boundaries or landmarks in the environment, the map comprising a static score associated with the object, the static score representing a likelihood that the object will remain immobile within the environment, the likelihood being between certain immobility and certain mobility;

planning a route through the environment using the map, the route comprises a segment containing the object, where the route is planned based on a weight assigned to the segment, the weight being based on the static score associated with the object; and after planning the route, controlling the autonomous vehicle while the autonomous vehicle is on the route, where controlling the autonomous vehicle comprises performing localization along the route based on static scores associated with objects along the route, and where localization comprises determining location, orientation, or both location and orientation of the autonomous vehicle within the environment.

29. The method of claim 28, wherein planning the route comprises determining a path through the environment that avoids the object if the object has a static score that is below a predefined threshold.

30. One or more non-transitory machine-readable storage media storing instructions that are executable by one or more processing devices on an autonomous vehicle configured to operate within an environment, the instructions being executable to perform operations comprising:

obtaining information about an object in an environment;

using the information in generating or updating a map of the environment, the map comprising the object and boundaries or landmarks in the environment, the map comprising a static score associated with the object, the static score representing a likelihood that the object will remain immobile within the environment, the likelihood being between certain immobility and certain mobility;

planning a route through the environment using the map, the route comprises a segment containing the object, where the route is planned based on a weight assigned to the segment, the weight being based on the static score associated with the object; and after planning the route, controlling the autonomous vehicle while the autonomous vehicle is on the route, where controlling the autonomous vehicle comprises performing localization along the route based on static scores associated with objects along the route, and, where localization comprises determining location, orientation, or both location and orientation of the autonomous vehicle within the environment.

31. The one or more non-transitory machine-readable storage media of claim 30, wherein planning the route comprises determining a path through the environment that avoids the object if the object has a static score that is below a predefined threshold.

\* \* \* \* \*